3,302,415
CRYOGENIC REFRIGERATING APPARATUS
Jean Royet, Saint-Maur, France, assignor to Compagnie Generale d'Electricite, Paris, France, a corporation of France
Filed Dec. 14, 1964, Ser. No. 422,482
Claims priority, application France, Dec. 12, 1963, 956,991
8 Claims. (Cl. 62—45)

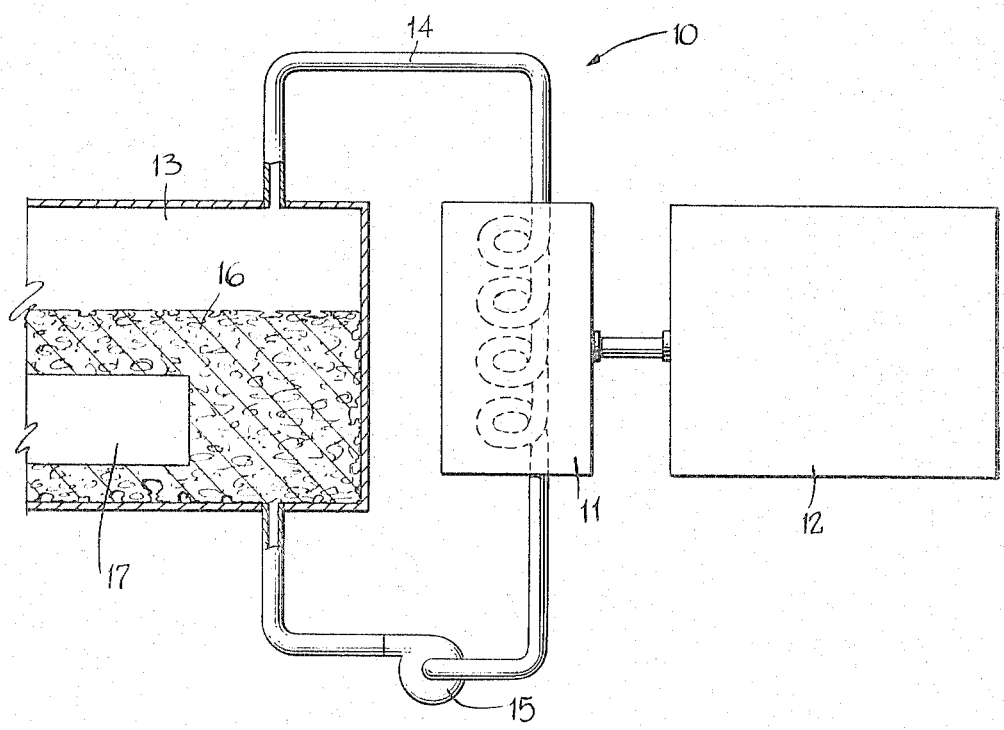

This invention relates to an improved refrigerating apparatus particularly adapted to be used to efficiently maintain devices or parts thereof at extremely low temperatures under a wide range of speed or acceleration conditions.

The principle of using the heat of vaporization of liquified gases for the purpose of refrigeration has been heretofore generally limited to stationary devices or equipment. The refrigeration of equipment in motion by means of this process, and in particular, under gravity free conditions or when subjected to high accelerations of random direction, or to vibrations of random amplitude or frequency, gave rise to new problems.

It was found that under dynamic testing, liquid level, as usually defined, no longer exists or becomes questionable at best since, in the case of more or less disorderly motions, it is difficult to define a surface separating the gaseous medium from the liquid medium.

Moreover, the part of the energy dissipated during the course of the agitation of the liquid may cause an undesirable consumption substantialy reducing the time of efficient operation for the equipment. This energy dissipation is, in particular, a function of the heat of vaporization and of the atomic weight and the quantity of the liquified gas.

Up to now, the use of cryogenic fluids for aircraft or space applications required more or less complex cryostats leaving unsolved the difficulties encountered in the case of fluids with very low vaporization points (e.g. helium).

The current expansion of techniques where temperatures close to that of liquid helium are used, such as in utilizing the superconductive properties of coils, requires the development of new devices capable of withdrawing calories from systems in motion.

It is, therefore, an object of the invention to provide an improved refrigerating apparatus comprising means to store liquified gas in such a manner as to render the operation of said apparatus more efficient as was heretofore possible under dynamic conditions.

Briefly stated, the invention provides a novel refrigerating apparatus to be used more particularly for the storage of cryogenic fluids, one of the main features of which is that it comprises an enclosure filled at least partly with an open-cell porous material that is in direct contact with at least a part of the equipment to be cooled. The aforesaid porous material has a high porosity ranging generally from 70 to 95% and preferably close to 90%; said cells have a definite discontinuity in their characteristic dimensions and are interconnected by capillary channels. The material thus constituted is spongy and is adapted to retain liquid by means of a capillary effect.

As the liquified gas is being poured on the aforementioned porous material, the liquid is adsorbed on the walls of the above-defined cavities and volumes, and there is a capillary retention in the channels as well as in the smaller cells. The structure of the material is such that the vapors emitted as a result of the vaporization phenomenon do not drive the liquid out of the channel. This undesirable sweating phenomenon is prevented by the definite discontinuity in the characteristic diameters of the capillary network of the porous material.

The cells having the smaller dimensions are used for the storage of the liquified gas while the cells of the larger dimensions facilitate the escape of the vapors emitted by the liquified gas.

It is to be noted that the sweating phenomenon is primarily due to the difference between the viscosity of the liquified gas and that of its vapor. The smaller the difference, the more significant the phenomenon; its significance is substantial, for instance, for liquified helium and its vapor at 4.2° K.

The starting material for making the porous substance is a powder which may be any material having a sufficiently good mechanical strength so as not to break during the binding, and having an adequate chemical inertness. The powder may be bound by any appropriate binder such as resin.

Among the materials which may be used in the preparation of the porous substance, the powders of zeolites, silica, alumina silicates, magnesia, fibrous materials such as cellulose may be mentioned by way of example, while the binder may be an epoxy resin such as araldite.

The fact that the porous material used has a high porosity implies that it has also a shape coefficient (i.e. the ratio of the dimension of the smallest powder particle to that of the largest) much smaller than unity.

According to the present invention, the porous material is placed in contact with the equipment to be cooled, as it will be described hereinbelow.

Referring now to the single figure in the drawing, there is shown schematically a closed cryogenic circuit generally indicated at 10. Elements of the circuit, such as evaporator 11 and a gas absorption refrigerating unit 12, are known per se and serve conventionally for recondensating the vapors generated in a thermally insulated enclosure 13 during operation. For the purpose of withdrawing the vapors from, and re-introducing the liquid refrigerant into, the enclosure, a conduit 14 is provided through which—by means of pump 15—the aforenoted circulation is maintained. The enclosure 13 is at least partially filled, e.g. by means of molding in place, with a porous substance 16 of the type described hereinabove. In direct contact with the porous material 16 is at least one part of the equipment 17 to be cooled (shown schematically). It is preferred that the equipment 17 be embedded into material 16. This may be achieved by molding the material around said equipment.

Before operation the liquified gas is introduced into the enclosure 13, for example, by simply pouring the same on the porous substance 16 constituting the capillary storage device means and arrangements necessary for the filling operation are believed to be known by those skilled in the art and are therefore neither described nor illustrated.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What I claim is:
1. In a closed cryogenic refrigeration apparatus of the type including a liquid refrigerant and adapted to cool an equipment, the improvement comprising a thermally insulated enclosure, a porous adsorbent material at least partially filling said enclosure and adapted to hold a refrigerant by adsorption, an equipment to be cooled at least partially embedded in said adsorbent material so as to be in direct contact therewith.

2. An apparatus as defined in claim 1, wherein said porous material is chemically inert, comprises open cells, and has a porosity ranging from 70 to 95%, said cells having a definite discontinuity in their characteristic dimensions and being interconnected by capillary channels.

3. An apparatus according to claim 2, wherein said porous material comprises at least one material selected from the group consisting of silica, alumina silicates, magnesia and powder of zeolite.

4. An apparatus as claimed in claim 2, wherein said porous material is made from a fibrous material.

5. An apparatus as claimed in claim 2 wherein said material is bound by an epoxy resin.

6. An apparatus as claimed in claim 5 wherein said epoxy resin is araldite.

7. An apparatus as claimed in claim 1 wherein said porous material is moulded-in-place around at least part of said equipment.

8. An apparatus as claimed in claim 1 wherein said porous material is included in a closed cryogenic circuit comprising a gas refrigerator for recondensating in said capillary channels the vapors generated in said enclosure during the operation of said equipment.

References Cited by the Examiner

UNITED STATES PATENTS

| | | | |
|---|---|---|---|
| 966,076 | 8/1910 | Bobrick | 62—373 |
| 2,662,379 | 12/1953 | Reich | 62—48 X |
| 2,663,626 | 12/1953 | Spangler | 62—48 X |
| 2,712,730 | 7/1955 | Spangler | 62—50 X |
| 3,108,445 | 10/1963 | Portzer et al. | 62—48 |
| 3,151,467 | 10/1964 | Cohen et al. | 62—50 X |
| 3,191,395 | 6/1965 | Maher et al. | 62—54 |

LLOYD L. KING, *Primary Examiner.*